March 8, 1960
I. H. POLK
2,927,439
METHOD AND APPARATUS FOR FREEZING UNPACKAGED PRODUCTS
Filed April 26, 1956
5 Sheets-Sheet 1
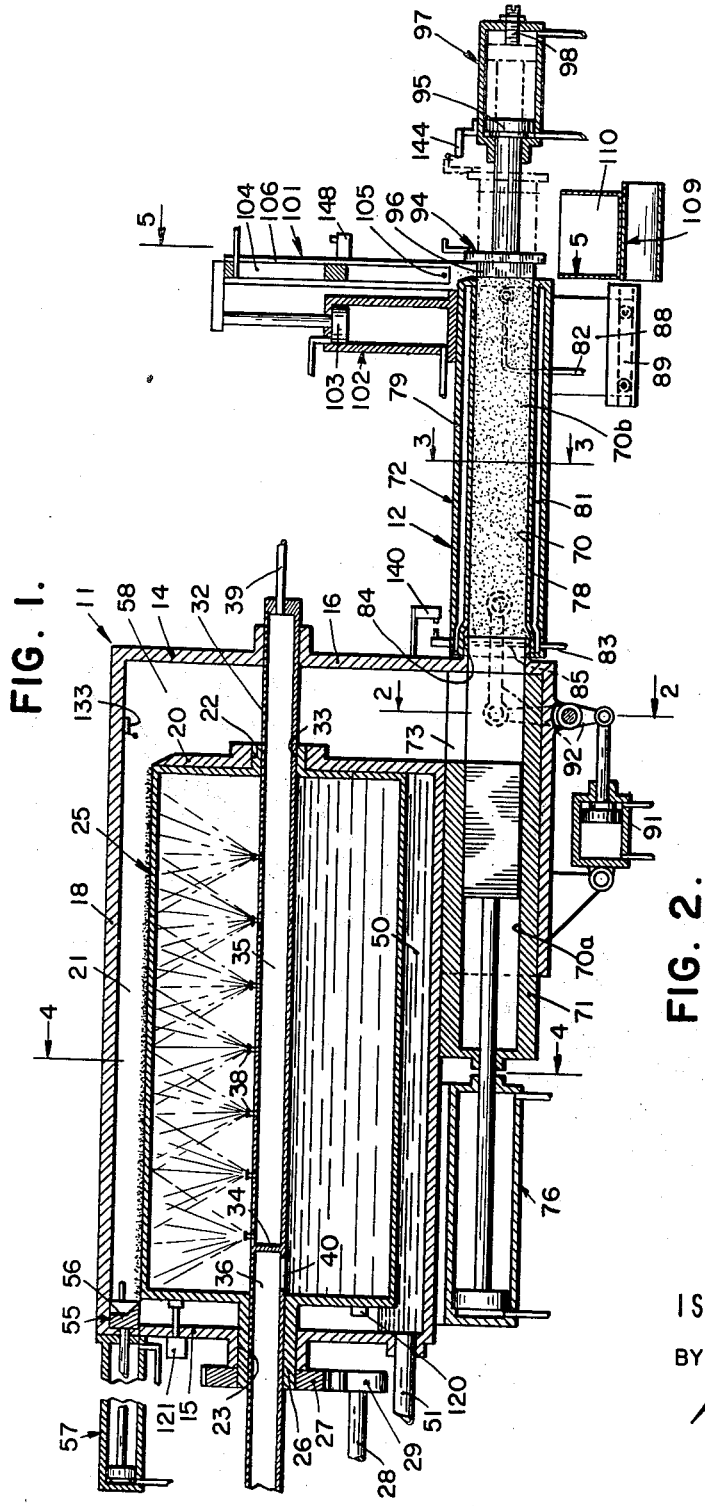
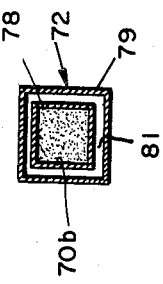
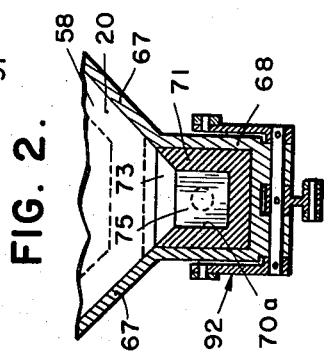
INVENTOR
ISAAC H. POLK
BY
*Mason & Graham*
ATTORNEYS March 8, 1960     I. H. POLK     2,927,439
METHOD AND APPARATUS FOR FREEZING UNPACKAGED PRODUCTS
Filed April 26, 1956     5 Sheets-Sheet 2

INVENTOR
ISAAC H. POLK
BY
*Mason & Graham*
ATTORNEYS

March 8, 1960     I. H. POLK     2,927,439
METHOD AND APPARATUS FOR FREEZING UNPACKAGED PRODUCTS
Filed April 26, 1956     5 Sheets-Sheet 3

INVENTOR
ISAAC H. POLK
BY
*Mason & Graham*
ATTORNEYS

March 8, 1960      I. H. POLK      2,927,439
METHOD AND APPARATUS FOR FREEZING UNPACKAGED PRODUCTS
Filed April 26, 1956      5 Sheets-Sheet 4
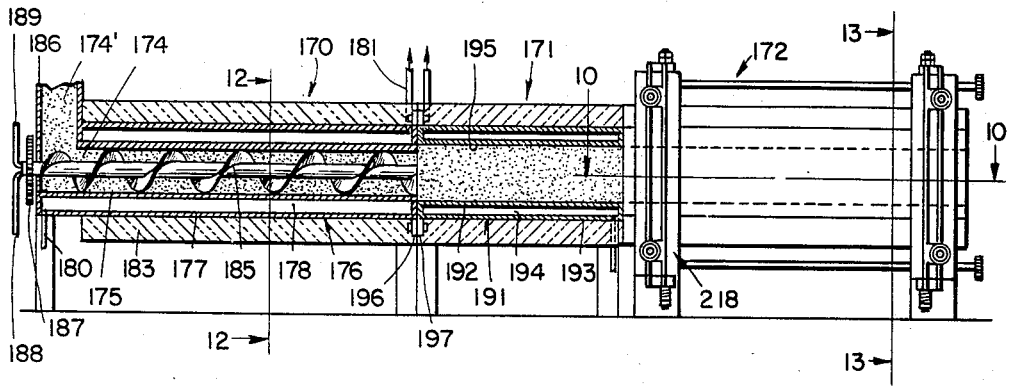
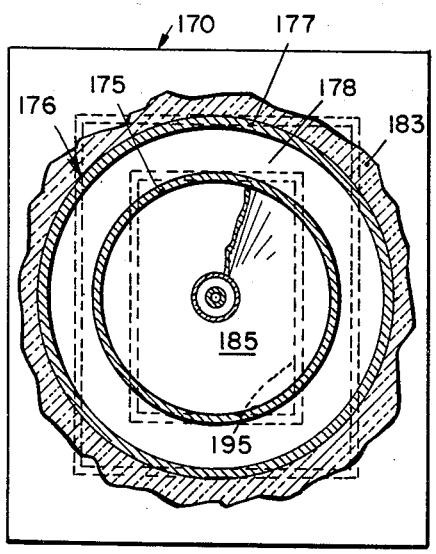
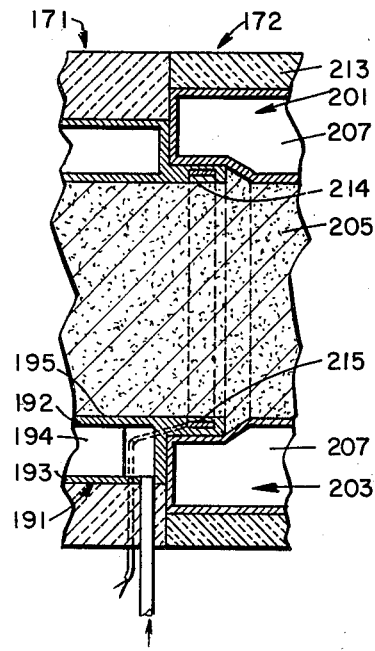
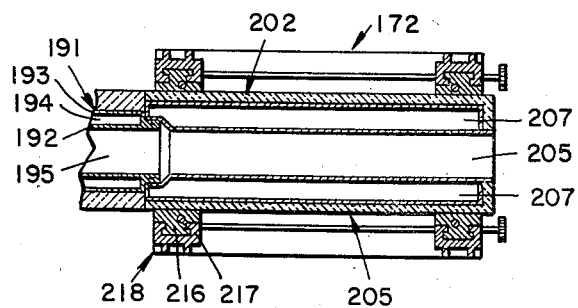
INVENTOR
ISAAC H. POLK
BY
Mason & Graham
ATTORNEYS March 8, 1960  I. H. POLK  2,927,439
METHOD AND APPARATUS FOR FREEZING UNPACKAGED PRODUCTS
Filed April 26, 1956  5 Sheets-Sheet 5

INVENTOR
ISAAC H. POLK
BY

ATTORNEYS

United States Patent Office 2,927,439
Patented Mar. 8, 1960

2,927,439

METHOD AND APPARATUS FOR FREEZING UNPACKAGED PRODUCTS

Isaac H. Polk, San Jose, Calif., assignor of twenty-five percent to William R. Graham, and twenty-five percent to Collins Mason, both of Los Angeles, Calif.

Application April 26, 1956, Serial No. 581,241

9 Claims. (Cl. 62—66)

This invention has to do in a general way with the freezing and hardening of products, such as comestibles. More particularly, the invention relates to the freezing and hardening of compressible liquid substances, such as ice cream and similar products, by a method and apparatus wherein the product or substance is frozen in a mold and expelled or delivered in hard, rigid condition.

Heretofore, so far as I know, it has been impossible to freeze and expel an unpackaged substance, such as a comestible, and produce a molded rigid product due to the adherence of the frozen product to the wall of the mold. It is even more difficult to freeze and expel a compressible substance, such as an ice cream mix containing air or gas, and expel a product of controlled density.

An object of this invention is to provide a novel method and apparatus for freezing and hardening a product in bulk, particularly a compressible food product, which delivers a rigid end product of predetermined uniform density and dimensions.

Another object is to provide a method and apparatus to deliver a frozen, rigid, compressible product wherein a positive predetermined relation is maintained between the weight and the dimensions of the product.

A particular object of the invention is to provide a method and apparatus for freezing and delivering a compressible substance, such as ice cream, while maintaining control of the density of the product.

Another object is to provide a machine for freezing and hardening products wherein the product is brought directly and intimately into engagement with refrigerated product-molding surfaces and wherein the frozen product may be instantaneously and completely disengaged from the surfaces without deformation of the molded product.

A further object is to provide a machine which permits uniform rates of freezing and hardening irrespective of the size or shape of the container in which the product is ultimately packed.

These and other objects will be apparent from the drawings and the following description thereof.

Referring to the drawings:

Fig. 1 is a central sectional elevation of apparatus embodying the invention;

Fig. 2 is a fragmentary section on line 2—2 of Fig. 1;

Fig. 3 is a section on line 2—2 of Fig. 1;

Fig. 9 is a combined central sectional and side elevational view of apparatus embodying a modified form of the invention;

Fig. 10 is a section on line 10—10 of Fig. 9;

Fig. 11 is an enlarged fragmentary sectional view in the same plane as Fig. 9 showing a joint between the movable and stationary parts of the device;

Fig. 12 is a section on line 12—12 of Fig. 9;

Figure 4:
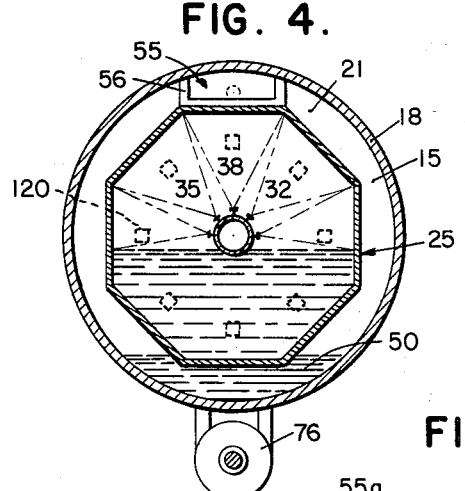
Fig. 4 is a section on line 4—4 of Fig. 1.
Figure 5:
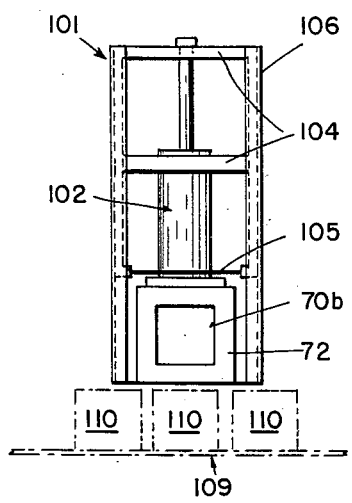
Fig. 5 is an end elevational view on line 5—5 of Fig. 1.

More particularly describing the invention, referring first to Figs. 1–5, inclusive, in Fig. 1 I show means for increasing the viscosity or conditioning the substance to be frozen which, for the purpose of the invention, may be considered to be an ice cream mix, and such means has been generally indicated by reference numeral 11. Below this I show means for campacting and delivering the hardened ice cream, and this means is generally indicated by the numeral 12.

Referring first to the prefreezing means 11, numeral 14 indicates a casing having end walls 15 and 16, and a circular wall 18 therebetween. Interiorly the casing is provided with a vertical partition wall 20 which divides the casing to form a receptacle or chamber 21 for a substance to be frozen. The wall 20 is apertured at 22 and end wall 15 is apertured at 23 for the purpose of journaling a rotatable drum, generally indicated by 25. The drum may be provided at one end with a tubular extension 26 extending through hole 23 which carries a driven star wheel 27. The drum is rotated intermittently by a suitable motor (not shown) which drives a shaft 28 carrying a single-toothed wheel 29 (Fig. 8) for engagement with the star wheel.

The drum is adapted to be refrigerated internally by spraying coolant on the upper interior surface thereof. For this purpose the drum is provided with an axially extending stationary hollow shaft 32 which is mounted at one end in the wall 16. The shaft extends through opening 33 in one end of the drum and through the tubular extension 26 on the other end of the drum, the drum being free to rotate on the shaft. The shaft is divided by a partition 34 into an intake passage 35 and an outlet passage 36. Communicating with the inlet passage are a plurality of spray heads 38 which are disposed to spray coolant against the inner side of the upper half of the drum as shown in Fig. 4. A refrigerant inlet tube 39, which may be connected to a suitable source of brine or other coolant, is connected to the shaft 32 outside the casing 14.

In the operation of the device it is contemplated that a relatively large quantity of coolant will be maintained in the drum at all times as to approximately the halfway level. As the coolant accumulates it escapes through a port 40 leading to outlet passage 36.

Figure 6:
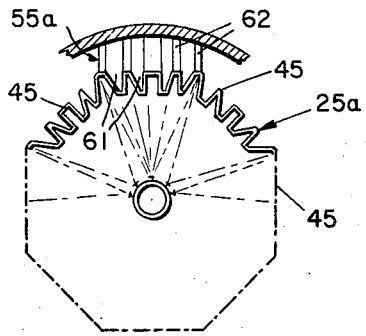
Fig. 6 is a fragmentary sectional view showing another form of freezing drum.
Figure 7:
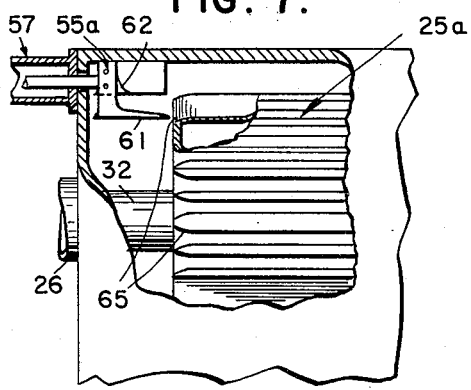
Fig. 7 is a fragmentary sectional view of the drum of Fig. 6.

In Figs. 1 and 4 I have shown a drum of octagonal shape in which each side is planar; however, I contemplate that if desired, the freezing surface of the drum may be increased by making each of the sides corrugated or formed with a series of channels. Referring to Figs. 6 and 7, I show such a drum, indicated by 25a, wherein the sides 45 of the drum are provided with the plurality of longitudinal channels of different cross-sectional shape. These are preferably somewhat flared in cross section with the greatest width at the outside for the dual purpose of facilitating removal of the frozen product without compressing it and to permit of the coolant being sprayed against the entire inner surface of the drum.

As previously indicated, the chamber 21 is adapted to contain the product to be frozen, such as a liquid ice cream mix 50, as it is delivered from the mutator at approximately 22° to 25° F. The product may be supplied to the chamber by an inlet pipe 51. In the operation the drum is intermittently rotated and in the form of drum shown makes one-eighth of a revolution each time it moves and stops in a position corresponding to that in which it is shown in the drawing. During the course of a cycle a thin layer of the product adheres to and becomes frozen upon the outer surface of the drum so that when each side reaches the uppermost position that side contains a thin layer of frozen product. Means are provided for removing the layer of frozen product from the uppermost side of the drum during the period in which the drum is stationary. Such means may take the form of a scraper member 55 having a head 56 which passes from end to end of the drum. The member may be actuated by a hydraulic piston and cylinder assembly, such as that shown at 57. The product which is scraped off the upper surface of the drum is delivered beyond the drum into the space 58 between the end of the drum and wall 16.

In Figs. 1–4 the scraper member has been shown as having a flat under surface with a beveled upper edge. In Figs. 6 and 7 I show another form of scraper which is designed particularly for the type of drum having a plurality of channels therein previously described. This scraper member (55a) is shaped to complement the channel configuration of the drum with which it is associated and in the drawing I show a lower set of teeth 61 which enter the respective channels in the drum and a plurality of shorter upper teeth 62 which correspond to the lands of the drum. It may be desirable to provide the channels at the scraper end of the drum with flared entrant ends such as shown at 65 in Fig. 7 to insure entry of the scraper head into the channels.

As previously indicated, the drum is rotated intermittently so that each side is successively removed of its frozen coating or layer of ice cream and the removed product falls in the space 58 into the extrusion portion of the machine 12. Referring now to this portion of the machine, the machine includes an elongated product passage 70 of desired cross-sectional shape, shown as square, which is formed in part by a stationary casing 71 and in part by a final hardening and delivery tube 72. The stationary case is provided with an opening 73 to the space 58 in the casing 14 for the reception of the frozen ice cream removed from the drum. The casing 14 has inclined walls 67 below shaft 32 at the end and below these, a depending wall portion 68 which receives the casing 71. Within portion 70a of passage 70 is a piston 75 operated by a suitable hydraulic piston and cylinder assembly 76. This piston is utilized initially for pushing the loose, frozen material into the passage 70b and for compacting the material therein.

The tube 72 comprises an inner wall 78 which defines the product passage and an outer wall 79. The two walls are spaced and integral at their ends to form a refrigerant space 81 therebetween. The space may be supplied with refrigerant by means of a flexible refrigerant input tube 82 and return pipe 83.

The tube 72 slightly overlaps in telescoping relation an extension 84 on wall 16 of casing 14. The extension may have an electric heating element 85 to prevent freezing of the parts against movement.

It is one of the features of the invention that means is provided for abruptly moving the tube 72 relative to the product therein and for this purpose the tube is shown supported on a block 88 which is supported for movement on a base plate 89. In order to impart movement to the tube I provide a piston and cylinder assembly 91 which is connected through a linkage 92 to the tube. When the piston and cylinder assembly is actuated it serves to abruptly move the tube a slight distance in a direction to the right shown in Fig. 1. When this movement is accomplished the product within the tube is held against movement by an abutment 94 in the form of a piston 95 having a product-holding head portion 96 which is shaped to be slidably received in the passage 70b. The piston operates in a cylinder 97 which contains an adjustment screw 98 for limiting movement of the piston. The operation of the abutment 94 will be explained later.

Mounted on the tube is a cut-off mechanism 101 which includes a piston-cylinder assembly 102. The piston 103 thereof is connected to a frame 104 having a product-severing wire 105. The frame 104 is mounted for vertical sliding movement in a stationary frame 106 whereby the wire may be caused to pass below the passage 70b to sever any extruded product projecting from the passage.

A conveyor 109 may be conveniently disposed below and beyond the end of the extrusion tube to carry cartons 110 to receive the severed product.

Figure 8:
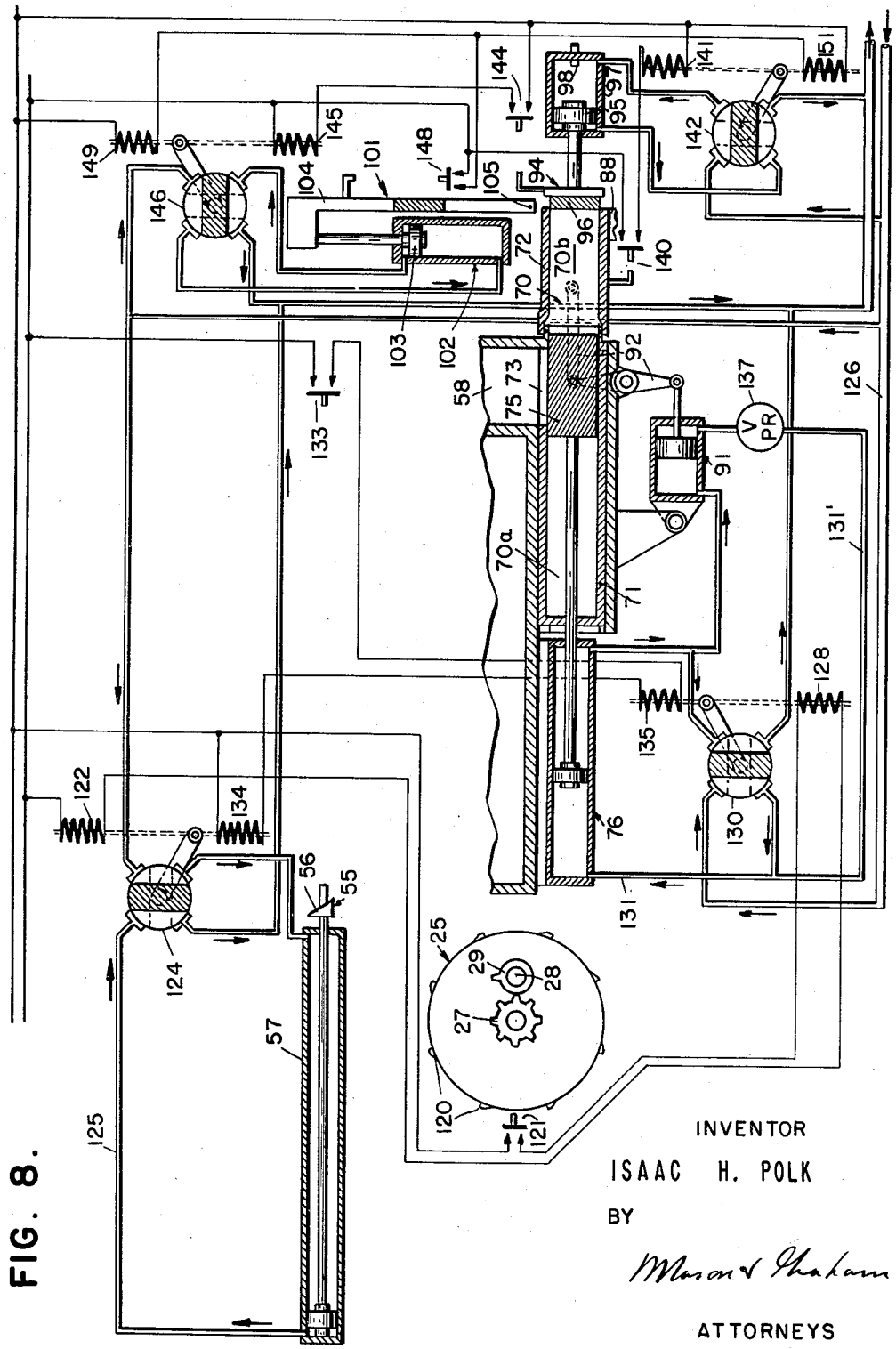
Fig. 8 is a schematic view showing the fluid and electrical operating parts of the invention.
Figure 13:
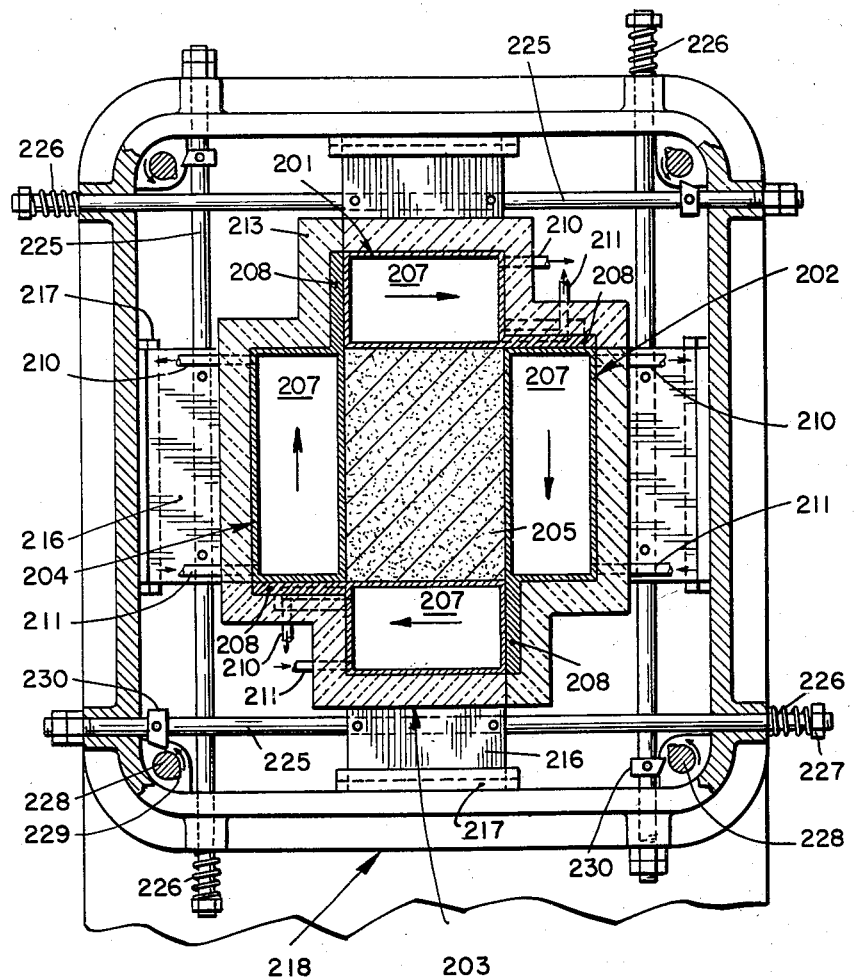
Fig. 13 is an enlarged section on line 13—13 of Fig. 9.

Referring to Fig. 8 for an explanation of the operation of the apparatus, as previously indicated, the drum 25 is intermittently rotated by wheel 29. The drum carries cams 120 which successively engage and momentarily close a switch 121 immediately before the drum stops. This switch, when closed, completes a circuit through a solenoid 122 which moves a control valve 124 to the broken-line position. This admits pressure fluid to the piston-cylinder assembly 57 through pipe 125 from supply pipe 126 to move scraper member 55 across the upper surface of the drum.

During movement of the drum the piston 75 is extended. When the drum stops this piston is retracted by action of solenoid 128 moving valve 130 to a broken-line position supplying pressure fluid to the cylinder through pipe 131, a circuit being completed through the solenoid by closing of switch 121.

When scraper 55 reaches the end of its movement it closes switch 133, thereby closing a circuit through solenoid 134, returning valve 124 to its original position with the result that the scraper is retracted. Closing of switch 132 also completes a circuit through a solenoid 135 which returns valve 130 to the position shown, thereby extending piston 75. Movement of the piston 75 moves the charge of frozen ice cream delivered by the scraper member into the tube 72.

It is a particular feature that a pressure relief valve 137 is interposed in pipe 131—131' between piston-cylinder assembly 76 and piston-cylinder assembly 91. Thus when piston 75 meets a predetermined resistance, piston-cylinder assembly 91 is actuated to move the extrusion tube 72.

During movement of the tube 72, the abutment 94 is held against the product by fluid pressure in cylinder 97. Movement of the tube 72 closes a switch 140 which completes a circuit through solenoid 141 to operate valve 142 to broken-line position which supplies fluid to cylinder 97 for withdrawing the abutment 94, and this permits delivery of the product by the piston 75.

Retraction of the abutment closes a switch 144 which completes an electrical circuit through solenoid 145 to operate valve 146 which supplies fluid to the cut-off piston-cylinder assembly 102, thereby actuating the cut-off wire to sever the expelled product. The latter then falls out of the way as into a carton 110 on belt 109. The cut-off wire is returned through the action of a switch 148 which it closes on reaching the end of its stroke to complete an electrical circuit through solenoid 149, moving valve 146 to full-line position. This switch also closes a circuit through solenoid 151 to operate valve 142 to return the abutment to its original position. The cycle is then repeated.

In Figs. 9–13 I show another form of the invention which is designed to deliver a frozen, rigid product. The machine shown in these figures is designed to receive the liquid product to be frozen, such as ice cream mix as it comes from the mutator. The machine is divided into three sections, a receiving section 170, a product-forming or shaping section 171, and a final hardening and delivery section 172. At the receiving end of the machine the section 170 comprises wall means forming a circular in cross-section product-receiving passage 174 and an inlet 174'. This passage is formed by the inner wall 175 of a casing 176. The casing includes an outer wall 177 spaced from the inner and cooperating therewith to form an annular coolant-receiving space 178. A suitable refrigerant inlet conduit 180 is provided at one end and an outlet 181 at the other. Insulation 183 may be provided about the outer wall.

Within the passage 174 I provide a helical screw conveyor 185, one end of which projects beyond the end of the wall 186 and is provided with a suitable gear wheel 187 which may be driven in any desired manner.

Preferably, I provide a hollow-type screw constructed for the circulation of a coolant therethrough, provided with an intake pipe 188 and an outlet pipe 189.

The product-forming section 171 includes a casing 191 comprising an inner wall 192 and an outer wall 193 together providing a space 194 for coolant. The casing is formed to provide a rectangular passage 195 therethrough. The two casings 176 and 191 may have abutting flanges 196 and 197 which may be bolted or otherwise secured together. Preferably the cross-sectional area of the product-forming passage 195 is slightly greater than the cross-sectional area of the receiving passage 174.

The final hardening and delivery section 172 is formed by a plurality of movable refrigerated walls or plates. In the form of the invention illustrated I show four such plates, indicated by the numerals 201, 202, 203, and 204, two of the plates being vertically disposed to form the sides of the passage 205 and two being horizontally disposed to form the top and bottom walls thereof. These plates are hollow of box-like construction in cross section each providing a coolant space 207. In addition, each plate is provided with a flange or extension 208 along one edge having an inner surface which is co-planar with the inner surface of the remainder of the plate. Flexible conduits 210 and 211, one at each end of each plate, are provided for circulation of coolant. Insulation 213 may be provided over the plates. The plates overlap an extension or neck 214 (Fig. 11) at the end of casing 191 which is provided with an electric heating element 215.

The two side plates are mounted for limited movement in vertical planes and the two other plates are mounted for limited movement in horizontal planes. Each plate is supported on a block 216 which has sliding engagement with a base plate 127. A T-slot connection may be provided between block and plate. The base plates are mounted stationarily on a surrounding frame 218 which can be supported in any suitable manner.

It is a particular feature of the invention that in order to free the product from the walls of the plates against which it is frozen the plates are intermittently moved to cause a shearing of the product with relation to the plate and preferably I provide means for moving each plate at right angles to the contiguous plate and counter to the opposite plate. Thus the upper plate (201) is moved in the direction of the arrow (Fig. 13) and then back. Each of the other plates is also initially moved in the direction of the arrow thereon and then back. Opposite plates may be moved simultaneously. However, I prefer to move the plates successively clockwise around the product.

It is to be understood that although the machine has been described on the assumption that the same will be mounted horizontally as shown in Fig. 9, the machine may be mounted vertically, that is, with the product passage being vertically disposed or, if desired, the machine may be inclined.

In order to provide for moving the plates each block 216 is provided with an actuating rod 225 which is axially slidably mounted in the frame 218, being urged to the position in which it is shown by a spring 226 between the frame and a nut 227 on the rod. A cam shaft 228 is provided for each rod, and this carries a cam 229 adapted to engage a collar 230 fixed on the rod. The shafts 228 may be driven by any suitable prime mover. It will be obvious that rotation of the shafts 228 will serve to successively move the rods and their connected plates to impart movement to the plates as previously described.

In the operation of the machine the product to be frozen is introduced through inlet passage 174' where it is picked up by the screw 185 and fed axially in the passage 174. It is to some extent frozen in the passage 174 and forced into passage 195 which, as previously pointed out, is of rectangular or other desired shape. During its passage through this portion of the machine the product is further frozen but does not reach a rigid condition. From the passage 195 the product flows into the final section 172 where it takes on its final, permanent, rigid shape. During its passage through the final section the product is prevented from freezing solid against movement therein by the action of the plates which are moved in a manner previously described to shear the product from the plates.

I contemplate that various types of movement may be imparted to the movable walls of the final hardening and delivery tube to shear the product from the walls. Some or all plates might be moved longitudinally as the tube in Fig. 1, but this would require an abutment for the product. By moving the plates at right angles to the direction the product is to be moved I utilize the plates themselves as product supports or abutments, each plate acting as an abutment for a contiguous plate. The plates may be moved one at a time in any order, or each pair of opposite plates moved together.

Figure 14:
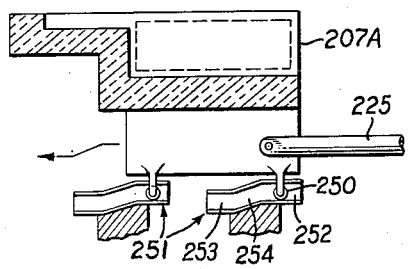
Fig. 14 is a schematic view of a modified plate mounting.

Although the invention has been particularly shown and described, it is contemplated that various changes and modifications can be made without departing from the scope thereof as indicated by the following claims. For example, there are instances where it may be desirable to provide for movement of the plates 207 outwardly away from the frozen product after the plates have been moved to shear adhesions between the plates and product to facilitate removal of the product. In Fig. 14 I show a single plate, designated 207A mounted to accomplish this. It will be understood of course that four such plates would be used in the manner of the plates 207. Plate 207A is shown provided with rollers 250 received in tracks 251. The tracks each have an inner section 252 and an outer section 253, the sections being connected by an inclined section 254. During freezing of the product the plate is positioned as shown. To free the frozen product, the plate is moved in the direction of the arrow thereon by any suitable motive power (not shown) which may be connected to the plate by a suitable rod 255.

It will be apparent from the construction shown and described that initially the plate moves in the plane of its inner surface thereby shearing any adhesions between the plate and product. Subsequently, the rollers 250 reach the inclined sections of the tracks and the plate moves outwardly from the product as the rollers progress to the outer sections 253 of the tracks. It will be apparent, therefore, that with four such plates, as in the case of a passage of rectangular cross section, there will be space provided between each plate and the product so that the product may be readily expelled. The plates of course are subsequently returned to their original positions.

I claim:

1. In apparatus for freezing a fluid product, a tubular freezing means formed by a plurality of refrigerated walls, means mounting said walls for movement in the planes of their inner surfaces, respectively, and in a direction generally normal to the axis of the tubular freezing means as a whole, and means for abruptly independently moving said walls, said walls each having an extension providing a co-planar projection of the inner surface of the wall to a region beyond the inner surface of an adjacent wall.

2. Apparatus as defined in claim 1 in which said tubular freezing means is formed of pairs of oppositely disposed walls.

3. In apparatus for freezing fluid substances and delivering the same in hard, frozen, rigid condition, refrigerated wall means forming a passage for the reception of the substance to be frozen, means for abruptly moving said wall means relative to the substance therein in a direction to cause shearing of frozen adhesions between said substance and said wall means, means for packing the substance to be hardened and extruded into said passage including a piston movable against the substance, and force applying means common to said packing means and said wall moving means constructed and arranged to move said piston against said substance, and, subsequently, to actuate said wall moving means upon said piston meeting a predetermined amount of resistance.

4. In apparatus for freezing a fluid substance to a hard, rigid, frozen condition, a plurality of refrigerated walls forming the sides of a freezing chamber for receiving the substance to be frozen, means supporting said walls for initial movement in the planes of their inner surfaces and for subsequent movement outwardly away from the planes of their inner surfaces, the general direction of movement of each plate being across the edge of an adjacent plate, and means for independently moving said plates.

5. Apparatus as set forth in claim 4 in which each of said walls has an extension at one edge providing a co-planar projection of the inner surface of the wall to a region beyond the inner surface of an adjacent wall.

6. In apparatus for freezing fluid substances and delivering the same in frozen, rigid condition, means forming an open-ended space for the reception of a substance to be frozen, said means comprising a plurality of refrigerated plates separately mounted for movement independently of each other in the planes of their inner surfaces transverse to the end-to-end axis of said space, and means for independently abruptly moving said plates.

7. In a method of hardening ice cream to a hard, frozen, rigid state, the steps of introducing unpackaged ice cream in a non-rigid state into a space defined by refrigerated wall means, freezing the unpackaged ice cream within said space and in direct contact with said wall means to a hard, rigid body, moving said wall means relative to said rigid body of ice cream in a manner and direction such as to shear the rigid body of ice cream free of said wall means, and expelling the sheared rigid body of ice cream from the wall means.

8. The method of claim 7 in which the unpackaged ice cream is introduced at one end of the space defined by said wall means and is expelled at the other end thereof and in which said wall means is moved transversely of said space.

9. The method of claim 7 in which the non-rigid ice cream is subjected to a predetermined pressure in said space.

References Cited in the file of this patent

UNITED STATES PATENTS

| | | |
|---|---|---|
| 530,526 | Holden | Dec. 11, 1894 |
| 1,218,985 | Collister et al. | Mar. 13, 1917 |
| 1,384,310 | Dungan | July 19, 1921 |
| 1,810,740 | Vogt | June 16, 1931 |
| 1,881,171 | Cooley | Oct. 4, 1932 |
| 2,062,277 | Routh | Nov. 24, 1936 |
| 2,206,419 | Miller | July 2, 1940 |
| 2,535,462 | Stoelting et al. | Dec. 26, 1950 |
| 2,561,477 | Magnuson | July 24, 1951 |
| 2,631,440 | Polk | Mar. 17, 1953 |
| 2,639,594 | Watt | May 26, 1953 |
| 2,670,296 | Tansley | Feb. 23, 1954 |